(12) United States Patent
Sommer et al.

(10) Patent No.: US 6,488,601 B1
(45) Date of Patent: Dec. 3, 2002

(54) ASSEMBLY FOR AN ELECTRONIC ELEMENT AND A HYDRAULIC ELEMENT OF A CONTROL DEVICE FOR THE AUTOMATIC TRANSMISSION OF A MOTOR VEHICLE

(75) Inventors: Stefan Sommer, Saulgau (DE); Bernd Fessler, Kressbronn (DE); Hubert König, Tettnang (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/857,094

(22) PCT Filed: Nov. 25, 1999

(86) PCT No.: PCT/EP99/09110

§ 371 (c)(1),
(2), (4) Date: May 31, 2001

(87) PCT Pub. No.: WO00/32966

PCT Pub. Date: Jun. 8, 2000

(30) Foreign Application Priority Data

Dec. 1, 1998 (DE) .......................................... 198 55 319

(51) Int. Cl.⁷ ............................................. F16H 59/36
(52) U.S. Cl. ........................................................ 474/70
(58) Field of Search .................. 474/69, 70; 74/606 R; 73/118.1; 251/148, 356; 137/554, 557

(56) References Cited

U.S. PATENT DOCUMENTS

| | | | |
|---|---|---|---|
| 4,271,728 A | 6/1981 | Wakamatsu | 74/866 |
| 5,611,372 A | 3/1997 | Bauer et al. | 137/884 |
| 5,709,134 A | 1/1998 | Ulm | 74/606 R |
| 5,749,060 A | * 5/1998 | Graf et al. | 340/439 |
| 5,845,544 A | * 12/1998 | Huggins et al. | 74/335 |
| 5,887,851 A | 3/1999 | Trzmiel | 251/129.15 |

FOREIGN PATENT DOCUMENTS

| | | |
|---|---|---|
| DE | 195 17 491 A1 | 11/1996 |
| DE | 43 44 584 C2 | 12/1996 |
| DE | 196 04 948 A1 | 8/1997 |
| EP | 0 758 719 A2 | 2/1997 |
| EP | 0 697 080 B1 | 3/1997 |
| WO | 95/30102 | 11/1995 |
| WO | 97/29305 | 8/1997 |

* cited by examiner

*Primary Examiner*—David A. Bucci
*Assistant Examiner*—Vicky A. Johnson
(74) *Attorney, Agent, or Firm*—Davis & Bujold, P.L.L.C.

(57) ABSTRACT

In an assembly of an electronic element (4) and a hydraulic element (3) of a control device (2) for the automatic transmission of a motor vehicle with a partially oil filled transmission housing wherein the control device (2) is arranged in the transmission housing wherein said control device (2) is arranged in the transmission housing and is at least partially surrounded by oil, the hydraulic element (3) has a valve housing (5) on which hydraulic valves (6), speed sensors (7, 8, 9) and pressure sensors (10, 11) are provided and is designed with a first housing part (5A) and a second housing part (5B). The first housing part (5A) has an at least approximately cuboid shape and is substantially arranged below a set of conical disks (1A) of a variator (1).

11 Claims, 2 Drawing Sheets

Figure 1:
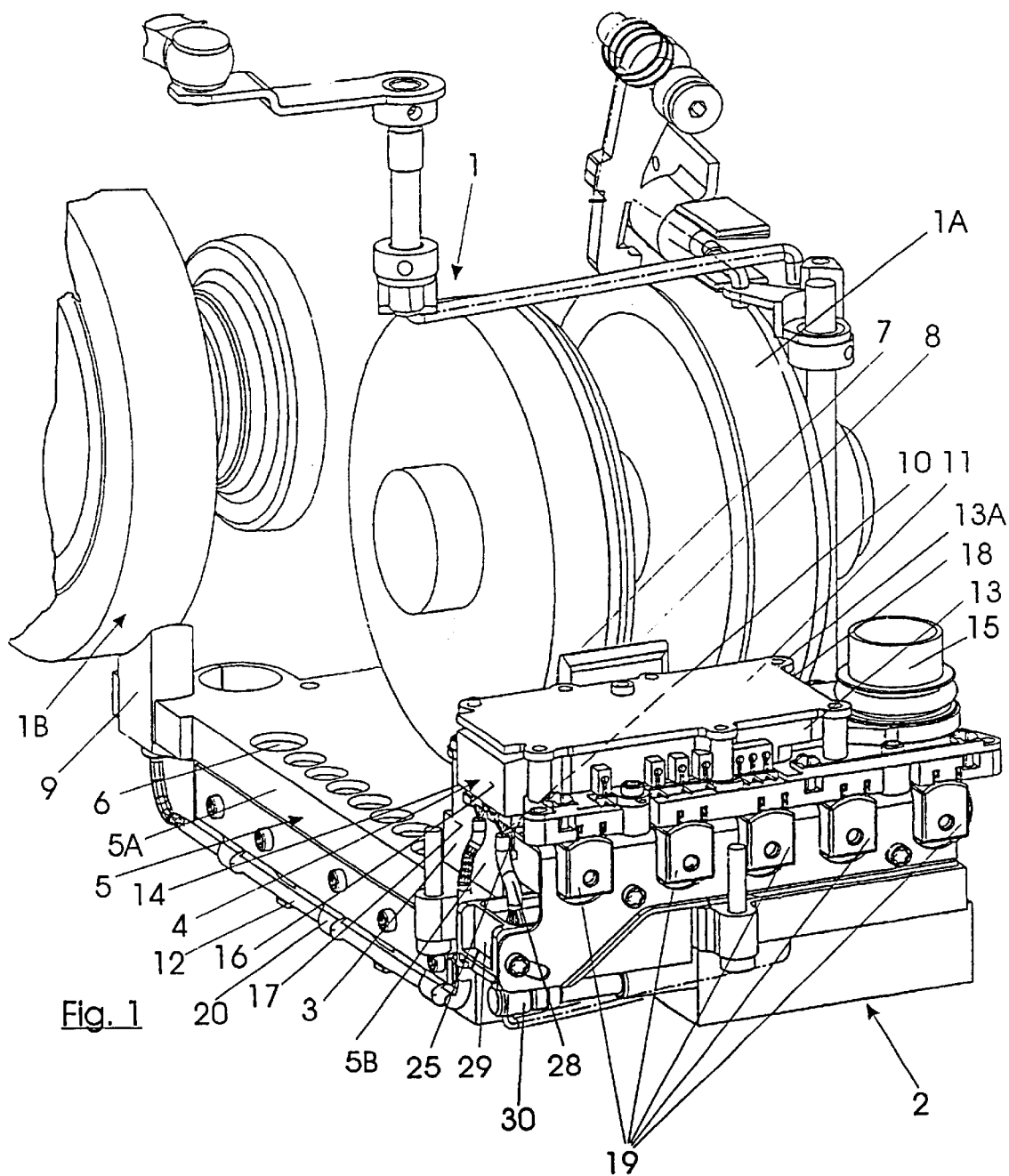

ASSEMBLY FOR AN ELECTRONIC ELEMENT AND A HYDRAULIC ELEMENT OF A CONTROL DEVICE FOR THE AUTOMATIC TRANSMISSION OF A MOTOR VEHICLE

The invention relates to an assembly for an electronic element comprising an electronic module and a hydraulic element of a control device for an automatic transmission of a motor vehicle having a transmission housing partly filled with oil wherein the electrohydraulic control device is situated in the transmission housing at least partly surrounded by oil.

It is known from the practice to dispose a control device for an automatic transmission outside the transmission housing and via lines to connect with the control device control means placed in the transmission housing such as actors or actuators.

However, this solution is disadvantageous in the sense that a long cable routing between the control means and control device is required, an additional space is needed for the control device situated outside the transmission housing.

In U.S. Pat. No. 4,271,728 and in EP 0 697 080 B1, a solution is proposed which solves the problem of the additional space needed by the control device being placed in the oil sump of a transmission, the electric connections between the control electronics and the control means being designed according to EP 0 697 080 B1 as rigid wires.

These known control devices, however, are of difficult access in fitting position and unsatisfactory regarding the arrangement of the components of the control device taking into account the very limited installation space.

In addition, the cooling of the heat-generating control electronics is insufficient in these known transmission controls. The proposed cooling of the control electronics by merely flowing transmission oil around the electronic element proves problematic specifically in operating situations at high temperatures of the transmission oil. Especially in modern automatic transmission, the oil can reach temperatures at which it cannot absorb the amount of heat generated by the electronic components. The consequence of this is an overheating of the electronic components and interruptions in the transmission control which can result in complete failure of the control electronics.

The problem to be solved by this invention is to provide an assembly of an electronic element, comprising an electronic module and a hydraulic element of a control device, for an automatic transmission of a motor vehicle wherein, while saving space, the control device surrounded by oil is disposed in a transmission housing that is of easy access in assembled state and wherein the electronic module of the control device is reliably protected from overheating.

This problem is solved according to the characteristic features of claim 1.

The inventive assembly of the electronic element and of the hydraulic element of the control device and the cooling of the electronic element make possible the utilization of the advantages of an assembly of the control device in the oil sump of the transmission housing with a correspondingly small need of space and short connections of the actuators, the electronic element and, in particular, the transmission central plug being reliably sealed.

Besides, the inventive assembly has the advantage that the construction of the control device does justice to operation and is simple, easy to install and of easy access into the vehicle in assembled state.

The inventive solution also ensures that the power loss of electronic modules is reliably eliminated and the operating temperature thereof is always kept low enough so as to prevent an interruption due to local overheating on an electroplate.

Thereby is not only increased the reliability of the transmission control but the service life of the electronic components is also extended.

Figure 2:
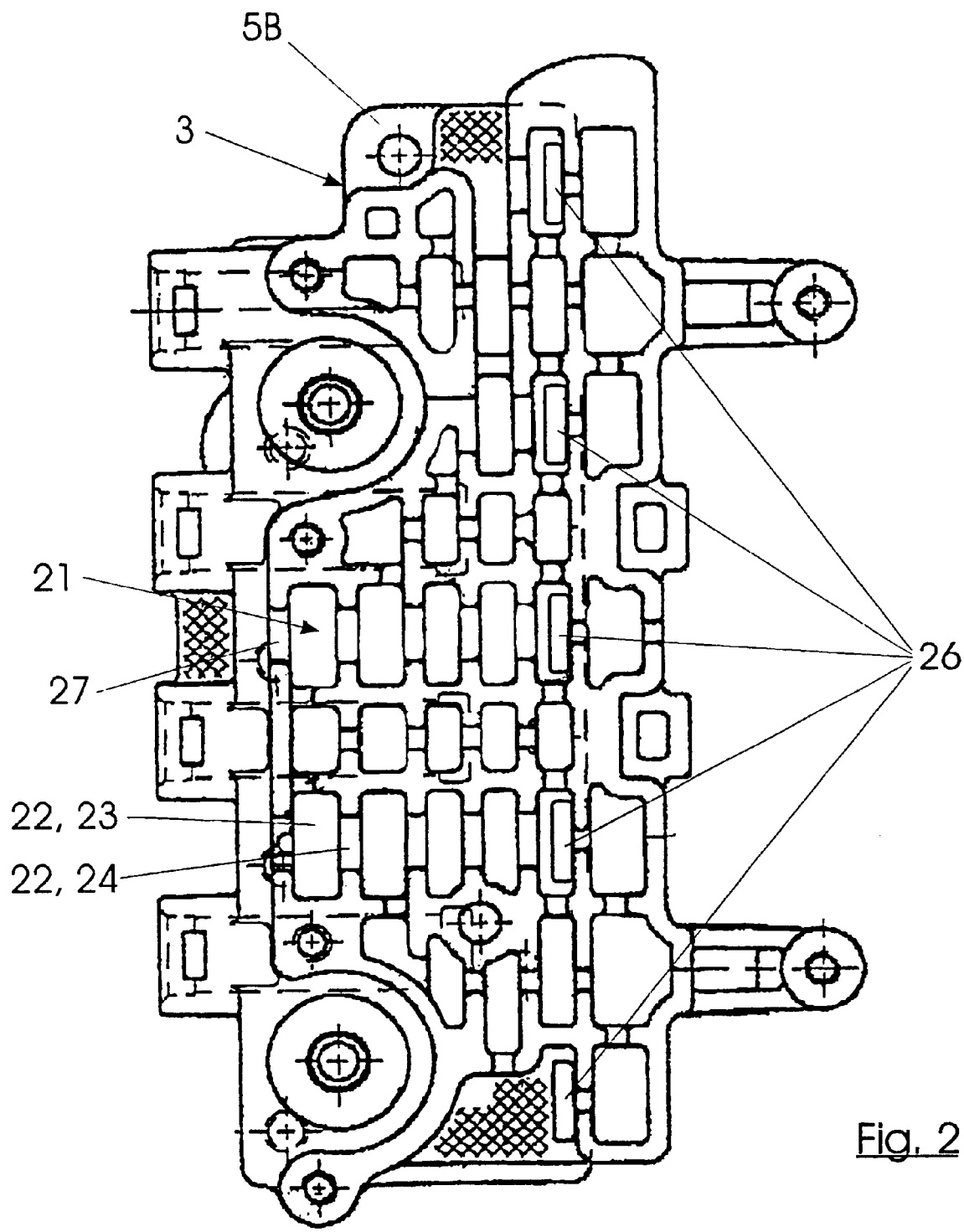

The invention will now be described, by way of example, with reference to the accompanying drawings in which:

FIG. 1 is a diagrammatic representation of one part of an automatic transmission with a control device of a transmission control placed in an oil sump; and FIG. 2 is a top view on a hydraulic element of the control device according to FIG. 1 after removal of an electronic element placed thereon.

Referring to FIGS. 1 and 2, diagrammatically shown are one part of an automatic transmission for a motor vehicle having a variator 1 and a control device of an electrohydraulic transmission control which are situated in a transmission housing not shown in detail.

The control device 2, which for transmission of signals, is connected with electric, mechanical and hydraulic control means of the transmission (not designated in detail), has a hydraulic element 3 and an electronic element 4 comprising an electronic module (not shown). In the instant embodiment, the control device 2 is completely surrounded by oil in the transmission housing.

The hydraulic element 3 has a valve housing 5 with a first housing part 5A and a second housing part 5B which accommodates several hydraulic valves 6 and rotational speed sensors 7, 8, 9 and pressure sensors 10, 11 connected with the electronic element 4.

The rotational speed sensors 7, 8 and 9 designed as Hall sensors are connected, via electric lines 12, with the electronic element 4.

The first housing part 5A is approximately cuboid and disposed in installation position in a vehicle substantially below the first conical disk set 1A of the variator 1.

The second housing part 5B extends upwardly from a lateral area of the first housing part 5A which does not lie below the first conical disk set 1A so that in installed position it is on the side of the first conical disk set 1A. On the second housing part 5B is situated the electronic element 4 which has a printed board substantially parallel to a base plane of the valve housing 5, which in FIGS. 1 and 2 is concealed by a housing 13 of the electronic element 4, but its situation is indicated with the reference numeral 14.

In an area upon the second housing part 5B of the valve housing, which is not enclosed in the housing 13 surrounding the printed board 14, there is located a receiving section 15 for a transmission central plug (not shown) in which the transmission central plug can be snugly inserted relative to the transmission oil.

The housing 13 of the electronic element 4 which snugly accommodates the printed board 14 is essentially cuboid and upwardly closed by a lid 13A, its front side 16 terminating approximately with the front side 17 of the underlying second housing part 5B of the valve housing 5 and with a sidewall of the first housing part 5A and on its second front side 18 bordering the receiving section 15 for the transmission central plug.

On the second housing part 5B of the valve housing 5 several pressure control devices 19 are disposed in an area bordering on the electronic element 4 in one line along the longitudinal side of the electronic element 4 remote from the variator 1.

In addition, on the second housing part 5B of the valve housing 5 two pressure sensors 10, 11 are provided. The rotational speed sensor 7 for detecting the turbine rotational speed N_T and the sensor 8 for detecting the rotational speed N_S1 of the first conical disk set 1A are disposed on the longitudinal side of the housing 13 of the electronic element 4 and of the second housing part 5B of the valve housing 5 facing the variator 1.

The sensor 9 for detecting the output rotational speed N_AB is placed on the side of the first housing part 5A of the valve housing 5 opposite to the side with the second housing part 5B and the electronic element 4. To the electronic element 4 leads as electric line a cable 12 which is passed on brackets 20 laterally along the side of the first housing part 5A on which border the front sides 16, 17 of the second housing part 5B and of the electronic element 4. Along the side of the first housing part 5A of the valve housing 5, on the top side thereof, are also arranged several of the hydraulic valves 6.

As can be especially seen in FIG. 2, between the second housing part 5B of the valve housing 5 and the electronic element 4 in the second housing part 5B, a cooling device 21 is situated by means of which the electronic element 4 is supplied with a defined flow rate of coolant having a temperature of $\theta\_c$ which is lower than the maximum prevailing transmission oil temperature $\theta\_G$. Thereby the operating temperature of the control device 2 and, in particular of the electronic element 4, is maintained at a low level even with a high transmission oil temperature $\theta_{\_G}$.

The cooling device 21 is designed with cooling duct 22 which border on the electronic element 4. In the area of the electronic modules which constitute power-building elements and generate a correspondingly great amount of heat, the cooling ducts 22 have a large cross-sectional surface and thus a large heat-exchange surface. The cooling ducts 22 are formed out in the valve housing 5 as a sort of labyrinth with pan-like enlargements 23 and narrow connecting grooves 24.

By the enlargements 23 and connecting grooves 24, the velocity of flow of the coolant and thus the heat-exchange time on different points in a cooling device 21 are varied in a defined manner according to the heat generation of the electronic modules of the electronic element 4.

The electronic element 4 has, toward the hydraulic element 3, an aluminum base plate 25 upon which the printed board 14 is placed.

FIG. 2, which is a top view of the hydraulic element 3 with the cooling ducts 22 without the electronic element 4 and its base plate 25, shows that the cooling ducts 22 are designed open toward the base plate 25. Thereby the base plate 25 is directly overflowed with coolant with the largest possible heat-exchange surface.

As coolant is used transmission oil has been cooled in a transmission cooler (not shown) prior to being fed to the electronic element 4. The flow rate of the coolant is provided so that the coolant coming from the transmission cooling system be injected into the hydraulic element 3 thorough inlet openings 26 in the area of the pressure control devices 19. From the inlet openings 26, the coolant passes upwardly into the cooling ducts 22 and overflows the base plate 25. Thereafter it is drawn off to the oil sump via outlet openings 27.

As can be seen in FIG. 1, a position sensor 29 connected with the electronic element 4 via electric lines 28 is fastened directly on and beneath the second housing part 5B of the valve housing 5 and disposed relative to a selector slide 33 linearly passed thereunder so as to measure the displacement path thereof which extends in longitudinal direction of the electronic element 4 and of the second housing part 5B of the valve housing 5.

The configuration of the position sensor 29, which, via a corresponding sensor device, directly measures the displacement path of the selector slide 30, affords the advantage that a direct constructional contact exists between the mechanical-hydraulic position of the selector slide 30 and the position sensor 29 without interrupting intermediate members. Thereby is obtained a short tolerance chain and tolerance minimizing which makes possible a precise detection of the position of the hydraulic selector slide in relation to hydraulic opening cross-sections and a precise electronic signal processing and signal issuance to the electronic transmission control.

It is thus ensured that with mechanical hydraulic setting of a defined shifting position of the transmission such as P for parking, R for reverse drive, N for neutral position, D and L for forward drive, the signal associated with the shifting position of the transmission be issued by the position sensor 29, a coded signal issuance considerably contributing to preventing shifting errors.

The position sensor 29 is designed as Hall sensor. This electronic design of the position sensor working according to the principle of a contactless switch is very advantageously suitable for an exact position detection.

Alternatively to this, in one other design not shown, the position sensor 29 can also be designed with a slip and lift contact sensor.

In every case the tolerance chain is shortened in a particularly advantageous manner by fastening the position sensor 29 directly on the hydraulic element 3.

What is claimed is:

1. An assembly of an electronic element (4) comprising an electronic module and a hydraulic element (3) of a control device (2) for an automatic transmission of a motor vehicle having a transmission housing partly filled with oil wherein said control unit (2) is situated in the transmission housing at least partly surrounded with oil, said hydraulic element (3) has a valve housing (5) on which hydraulic valves (6), rotational speed sensors (7, 8, 9) and pressure sensors (10, 11) are provided, said valve housing (5) has a first housing part (5A) and a second housing part (5B), upon said second housing part (5B) are provided said electronic element (4) with a printed board (14) disposed substantially parallel to a base plane of said valve housing (5) and a receiving section (15) for a transmission central plug, said second housing part (5B) has several pressure control device (19), a cooling device (21) by means of which at least one part of said electronic element (4) can be cooled and a position sensor (29) for detecting a position of a selector slide (30) directly situated on said hydraulic element (3), wherein said first transmission housing part (5A) is at least approximately cuboid and substantially disposed below a conical disk set (1A) of a variator, that said second housing part (5B) extends from a lateral area of said first housing part (5A) upwards laterally of said conical disk set (1A), that said electronic element (4) has a substantially cuboid housing (13) sealing said printed board (14) and upwardly closed by a lid (13A), one front side (16) of said housing at least approximately terminates with the front side (17) of said underlying second housing part (5B) of said valve housing (5) and with a sidewall of said first housing part (5A) and on its front side (18) borders said receiving section (15) for the transmission central plug and that said pressure control devices (19) are at least approximately disposed in one line along the longitudinal side of said electronic element (4) remote from said variator (1).

2. The assembly according to claim 1, wherein said pressure sensors (10, 11) are provided in the area of said second housing part (5B) of said valve housing (5).

3. The assembly according to claim 1, wherein as rotational speed sensors (7, 8, 9) are provided one sensor (7) for detecting a turbine rotational speed N_T, one sensor (8) for detecting a rotational speed N_S1 of said first conical disk set (1A) of said variator (1) and one sensor (9) for detecting an output rotational speed N_AB, said sensors being connected with said electronic element (4) via electric line (12), that said rotational speed sensors (7, 8, 9) are designed as Hall sensors, said sensor (7) for detecting the turbine rotational speed N_T and said sensor (98) for detecting the rotational speed N_S of said conical disk set (1A) being disposed on the longitudinal side of said housing (13) of said electronic element (4) facing said variator (1) and said sensor (9) for detecting the output rotational speed N_AB being disposed on the side of said first housing part (5A) of said valve housing (5) opposite to the side with said second housing part (5B) and said electronic element (4).

4. The assembly according to claim 3, wherein said electric line (12) from said sensor (9) for detecting the output rotational speed (N_AB) to said electronic element (4) is designed as cable which is passed on brackets (20) laterally along said first housing part (5A).

5. The assembly according to claim 1, wherein in said first housing part (5A) of said valve housing (5) several hydraulic valves (6) are provided along the side on which border the front sides (16, 17) of said second housing part (5B) and of said electronic element (4).

6. The assembly according to claim 1, wherein in a transition area between said second housing part (5B) of said valve housing (5) and said electronic element (4) of said second housing part (5B), said cooling device (21) is designed with cooling ducts (22) which border on said electronic element (4).

7. The assembly according to claim 6, wherein said cooling ducts (22) have the largest heat-exchange surface in the area of electronic modules that constitute power-building elements.

8. The assembly according to claim 6, wherein said cooling ducts (22) are designed open toward a base plate (25) of said electronic element (4) upon which said electronic modules are disposed.

9. The assembly according to claim 8, wherein said cooling ducts (22) are designed as labyrinth in the hydraulic element (3) wherein the coolant coming from a transmission cooling system enters through inlet operating (26) in the area of the pressure control devices (19) in the hydraulic element (3), overflows the base plate (25) and is removed to the oil sump via outlet openings (27).

10. The assembly according to claim 1, wherein the position sensor (29) connected via electric lines (28) with said electronic element (4) is disposed relative to the linearly passed selector slide (30) so as directly to measure the displacement path thereof which extends in longitudinal direction of said electronic element (4) of said second housing part (5B) of said valve housing (5).

11. The assembly according to claim 10, wherein said position sensor (29) is designed as Hall sensor.

\* \* \* \* \*